(12) United States Patent
Lenin et al.

(10) Patent No.: US 9,851,930 B2
(45) Date of Patent: Dec. 26, 2017

(54) RELEASE CODES WITH PRINT JOB IDENTIFIERS AND DIRECTIVES

(71) Applicant: HEWLETT-PACKARD DEVELOPMENT COMPANY, L.P., Houston, TX (US)

(72) Inventors: Fernandes Lenin, Bangalore (IN); Ganesan Kumaravel, Chinnalappati Dindigul (IN); K. S. Venugopal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/770,992

(22) PCT Filed: Jul. 1, 2013

(86) PCT No.: PCT/IN2013/000405
§ 371 (c)(1),
(2) Date: Aug. 27, 2015

(87) PCT Pub. No.: WO2014/155385
PCT Pub. Date: Oct. 2, 2014

(65) Prior Publication Data
US 2016/0202939 A1 Jul. 14, 2016

(30) Foreign Application Priority Data
Mar. 28, 2013 (IN) ............... 1395/CHE/2013

(51) Int. Cl.
G06F 3/12 (2006.01)
H04N 1/00 (2006.01)
H04N 1/32 (2006.01)

(52) U.S. Cl.
CPC .......... G06F 3/1222 (2013.01); G06F 3/1236 (2013.01); G06F 3/1238 (2013.01);
(Continued)

(58) Field of Classification Search
CPC .... G06F 3/1238; G06F 3/1268; G06F 3/1267; G06F 3/1292; G06F 3/1222; G06F 3/126; H04N 1/32101
(Continued)

(56) References Cited

U.S. PATENT DOCUMENTS 6,751,732 B2 6/2004 Strobel et al.
8,154,752 B2 4/2012 Shaw et al.
(Continued)

FOREIGN PATENT DOCUMENTS

CN 1575460 2/2005
CN 201769452 3/2011

OTHER PUBLICATIONS

Fernandes, L. et al., The Mobile Print Enterprise, http://www.quocirca.com/media/reports/012012/653/The%20mobile%20print%20enterprise%20Public%20Excerpt%20Jan%202012.pdf, Jan. 2012.
(Continued)

Primary Examiner — Eric A Rust
(74) Attorney, Agent, or Firm — HP Inc. Patent Department

(57) ABSTRACT

In one example, a print job is received from a first mobile computing device. The print job is stored in association with a job identifier. The job identifier is sent to the first mobile device. A release code is received from a second mobile computing device. The release code includes the job identifier and a directive regarding printing or forwarding of the job, and was received at the second mobile device from the first device via a wireless transaction. A network-connected printer associated with the second device is identified. Responsive to a determination that the release code is valid, the print job is sent to the printer.

19 Claims, 5 Drawing Sheets

(52) U.S. Cl.
CPC .......... *G06F 3/1267* (2013.01); *G06F 3/1268* (2013.01); *G06F 3/1292* (2013.01); *H04N 1/00307* (2013.01); *H04N 1/32101* (2013.01); *H04N 2201/006* (2013.01); *H04N 2201/0094* (2013.01)

(58) Field of Classification Search
USPC ...................................... 358/1.15, 1.16, 1.14
See application file for complete search history.

(56) References Cited

U.S. PATENT DOCUMENTS

| | | |
|---|---|---|
| 2004/0001217 A1 | 1/2004 | Wu |
| 2005/0016744 A1 | 1/2005 | Miyakawa |
| 2005/0128520 A1* | 6/2005 | Glickman ............... G06F 21/57 358/1.15 |
| 2005/0146744 A1* | 7/2005 | McAllister ......... H04N 1/00244 358/1.15 |
| 2010/0202006 A1* | 8/2010 | Nuggehalli ........... G06F 21/608 358/1.14 |
| 2010/0309508 A1* | 12/2010 | Kamath ................ G06F 3/1204 358/1.15 |
| 2012/0019867 A1 | 1/2012 | Prati et al. |
| 2012/0026536 A1 | 2/2012 | Shah |
| 2012/0105906 A1 | 5/2012 | Godavari et al. |
| 2012/0307284 A1 | 12/2012 | Chien |
| 2013/0027744 A1* | 1/2013 | Takahashi ............. G06F 3/1204 358/1.15 |
| 2013/0038896 A1 | 2/2013 | Nalewajek |
| 2013/0038898 A1 | 2/2013 | Nuggehalli |
| 2013/0083337 A1 | 4/2013 | Tecu et al. |
| 2013/0085968 A1* | 4/2013 | Schultz .................. G06F 21/32 705/400 |
| 2013/0194623 A1* | 8/2013 | Tecu ..................... G06F 3/1204 358/1.15 |
| 2014/0012970 A1* | 1/2014 | Parry ................... H04W 4/001 709/224 |

OTHER PUBLICATIONS

PCT Search Report and Written Opinion dated Jan. 2, 2014, Indian Patent Application No. PCT/IN2013/000405 filed Jul. 1, 2013.

* cited by examiner

RELEASE CODES WITH PRINT JOB IDENTIFIERS AND DIRECTIVES

BACKGROUND

Certain printers are capable of receiving communications and printable content via the internet without being connected to a desktop computer, notebook computer, or other host computing device. An advantage of such a printer is that print jobs can be received for printing from other computing devices located anywhere around the globe.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

FIG. 2C is an example of a user interface to facilitate a release code printing service, according to various examples.

FIG. 2D is an example of a user interface to facilitate a release code printing service, according to various examples.

DETAILED DESCRIPTION OF EXAMPLES

Figure 1:
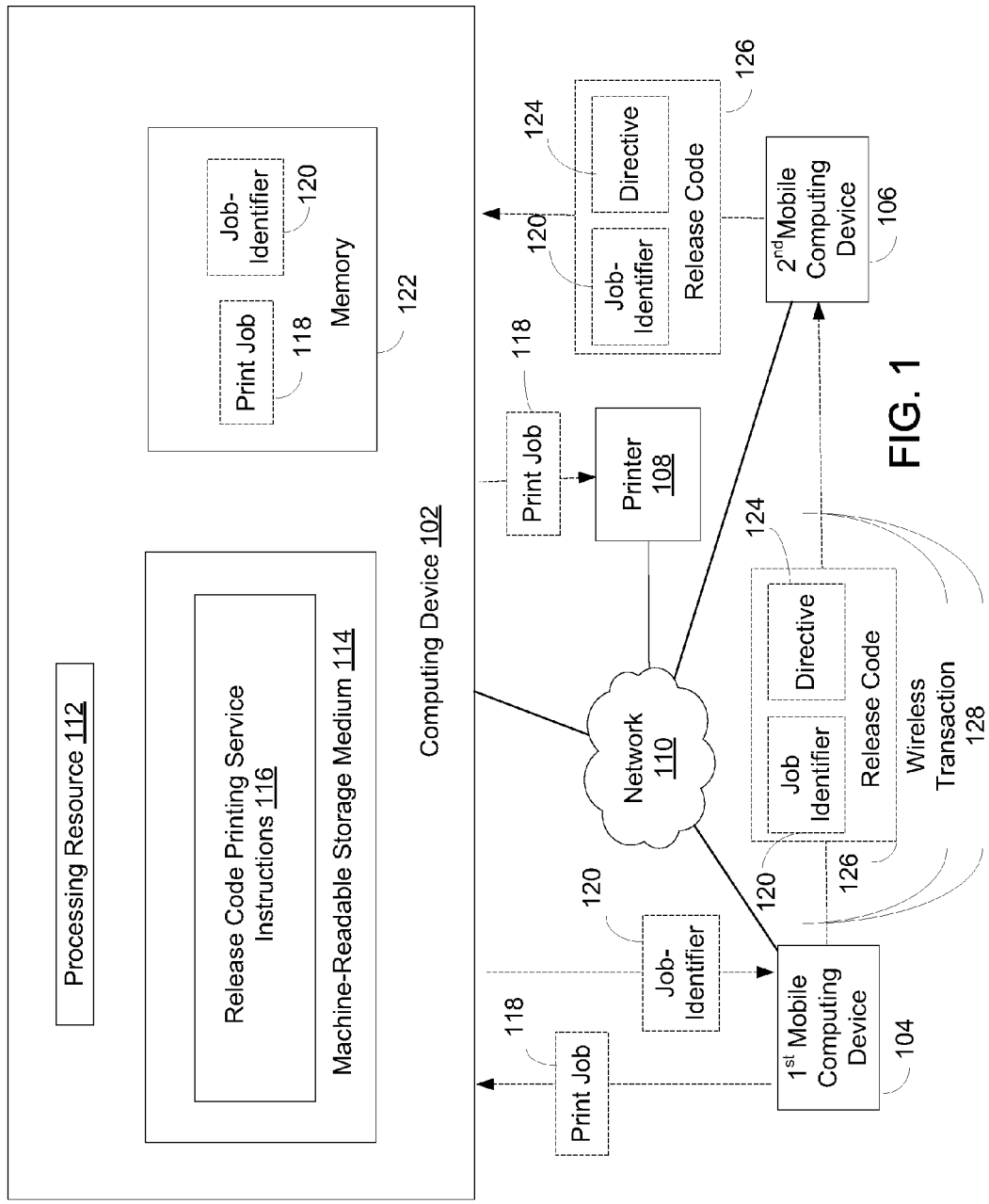
FIG. 1 is a block diagram illustrating a system, according to various examples.

In an example, a job sending computing device may send a print job to a cloud-based printing service, with the cloud-based service in turn sending the print job to an internet connected printer. A benefit of utilizing internet connected printers and cloud-based printing services is that print jobs may be easily transmitted between across geographies.

Another benefit of utilizing internet connected printers and cloud-based printing services is that transmission of print jobs via the internet makes it easy for a first user of a job sending device to share a print job by sending the job to a second computing device associated with a second user. However, when a print job is of a confidential nature, the ease with which a print job can be shared over the internet between computing devices and printers can raise significant security issues. Without adequate security controls enforced with respect to the sharing, the first user that shares a print job with a second user may lose control of the shared print job and the confidentiality of the print job can be lost. On the other hand, security controls that are burdensome or overly complex will inhibit the job-sharing benefits that internet connected printers and cloud-based printing systems can provide.

To address these issues, examples described herein were developed and may provide a release code printing service. In an example, a user of a smart phone or other first mobile computing device may desire to share a print job with a user of another smart phone or other second mobile computing device. In this example, the user of the first device sends a print job to a release code printing service ("RCPS") executing at a server or other computing device. The RCPS receives the print job from the first device and stores the job in association with an identifier for the print job, e.g., storage within a database. After the storing the print job in association with the job identifier, the RCPS sends the job identifier to the first device that sent the print job to the RCPS.

Continuing with this example, after the first device receives the identifier from the computing device, the first device creates or receives a release code that includes the job identifier and a directive or directive regarding future restrictions on printing or forwarding of the print job. In an example, the directive may represent instructions received from a user of the first device, e.g. instructions entered by the user via a touchpad, keypad, or other user interface at the first device from an. In examples, the release code may be created or generated at the first device, or may be received from another computing device. In turn, the first device sends the release code to a second mobile computing device via a near field communication, Bluetooth™, or other wireless transaction.

Continuing with this example, after receipt of the release code at the second mobile device, the second mobile device sends the release code to the server system and the RCPS executing at the server system receives the release code. After the job identifier and the directive are revealed, the RCPS utilizes the job identifier to identify a network-connected printer associated with the second mobile device, and utilizes the directive to determine the validity of the release code. In an example, identifying the printer includes accessing a database that associates printers or printer users with mobile computing devices. In another example, identifying the printer associated with the second mobile device includes receiving from the second mobile device a print directive that identifies the second printer as a printer associated with the second mobile device, and instructs the RCPS to send the print job to the identified printer.

In an example, determining the validity of the release code includes determining that the RCPS sending the job to the identified printer will not violate the directive. If the RCPS determines that sending the job to the identified printer will not violate the directive, and that the release code is not otherwise invalid, the RCPS causes sending of the print job to the printer for printing. In an example, the RCPS receives a message from the printer that confirms printing, and the RCPS in turn sends a message to the first device to inform a user that the job that was shared with the second mobile device has been printed.

In some examples of the disclosure, the RCPS executing at the server system may send to the first device an application to facilitate sending of the print job from the first device to the RCPS, and to facilitate the sending of the release code from the first device to the second mobile device. In examples, the RCPS executing may send to the first second mobile device a copy of that software application or a distinct software application, to facilitate receiving of the release code at the second mobile device from the first device, and to facilitate the second mobile device sending to the RCPS the release code that the second mobile device received from the first device.

Advantages of the disclosure are numerous. First, users will appreciate that a release code printing service provides the ability to send a print job to an acquaintances' printer with reduced concerns about print job security as it is a release code, rather than the print job, that is exchanged between the user and the acquaintance's mobile devices. Users will appreciate the simplicity of utilizing a release code as disclosed herein, as the mobile devices that exchange the release code can do so via a NFC electronic handshake or other wireless transaction, such that there is not a need for users to memorize or type character strings representing codes or keys. Another advantage of the release code printing service disclosed herein is that the exchange of the release code is from one mobile device to another, and can be accomplished via the NFC handshake or other wireless transaction far from the physical location of the printer that will print the job. Accordingly, there is no need that the printer support the NFC or other wireless protocol that the mobile devices use to exchange the release code.

Another advantage of the disclosure herein is that a user at the first mobile device that shares the release code with a second mobile device can set print directives, to be embedded in the release code, that will allow the print job to forwarded, e.g., from the second mobile device to a third mobile device, and from a third mobile device to a fourth mobile device, etc., a predetermined number of times. The print directive can also be used to impose other restrictions upon the print job that is shared between mobile devices, e.g. a permissible time of day for printing, permissible range of times or dates that the job can be printed, or a number of print copies authorized. Another advantage is that the disclosed release code printing service enables the sending of a print job notification to the first device that shares the print job with the second mobile device, informing the a user at the first device that the job was printed, how many times the job was printed, etc. These and other advantages of the disclosure will cause users to be more likely to explore and utilize internet connected printers and cloud print services to print sensitive and confidential materials. Accordingly, user satisfaction with network-connected printers and cloud-based print services will increase.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing.

As used herein, a "print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data. A "document" refers to an electronic collection of data that provides information or evidence, or that serves as an electronic record. As used herein, a "computing device" may be a server, computer networking device, chip set, desktop computer, notebook computer, workstation, mobile computing device, tablet computer, smartphone or any other processing device or equipment. The terms "mobile computing device" and "mobile device" are used synonymously, and refer to any portable computing device.

A "job identifier" refers to something, e.g., any text, number, PIN, password, character string, image, graphic, or other data or element that can be that can be processed and stored by a computer, and that identifies, indicates, or names a print job. A "release code" refers to something, e.g., any text, number, PIN, password, character string, image, graphic, or other data or element that can be provided in some manner, e.g., by a user or a system, to initiate an event or get the use of something, including, but not limited to, to retrieving and/or printing a print job.

A "wireless transaction" is a transfer of data between two devices, e.g., between two computing devices, that are not connected by an electrical conductor. A "short-range wireless protocol" refers to a wireless communication protocol or standard for exchanging data over short distances, typically fifty meters or less. An "application" refers to a web application, software application, firmware application, or other programming that executes at, or accessible at, a computing device.

As used herein, a "processing resource" and a "processor" are used synonymously and refer generally any instruction execution system, such as a computer/processor based system or an ASIC (Application Specific Integrated Circuit), a computer, or other system that can fetch or obtain instructions or logic stored in a memory and execute the instructions or logic contained therein. In examples, a processing resource or processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may include, for example, one processor or multiple processors included in a single computing device or distributed across multiple computing devices.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Referring now to the drawings, FIG. 1 shows a computing device 102, a first mobile computing device 104, a second mobile computing device 106, and a printer 108, each electronically connected to a network 110. Computing device 102 represents generally any computing device or group of computing devices configured to send and receive network requests, send and receive data, and/or otherwise communicate with the first device 104, the second mobile device 106, and the printer 108 via network 110. First and second mobile computing devices 104 and 106 each represents generally a smartphone, tablet computer, notebook computer, or any other mobile computing device configured to send and receive network requests, send and receive data, and/or otherwise communicate with the computing device 102 via the network 110. First and second mobile computing devices 104 and 106 are each configured to exchange data with the other in a wireless transaction according to a near field communication ("NFC"), Bluetooth™, or other wireless protocol. Network-connected printer 108 represents generally any computing device or group of computing devices operable to produce a printed print job or printed content, and additionally operable to send and receive internet requests, receive printable content and print jobs, and otherwise communicate, via the network 110, with, the computing device 102.

Network 110 represents generally hardware components and computers interconnected by communications channels that allow sharing of resources and information. Network 110 may include a cable, wireless, fiber optic, or remote connection via a telecommunication link, an infrared link, a radio frequency link, or some combination of these, or any other connectors or systems that provide electronic communication. Network 110 may include, at least in part, an intranet, the internet, or a combination of both. Network 110 may also include intermediate proxies, routers, switches, load balancers, and the like. The paths followed by network 110 between the computing device 102, first mobile computing device 104, second mobile computing device 106, and printer 108 as depicted in FIG. 1 represent the logical communication paths between these devices, not necessarily the physical paths between the devices.

In an example, computing device 102 includes a processing resource 112 and a machine-readable storage medium 114 encoded with instructions 116. In an example, the instructions 116 cause computing device 102 to implement a release code printing service that enables secure sharing of print jobs via a process that includes exchange of a print release code between first and second mobile computing devices. In some examples, storage medium 114 may include additional instructions. In other examples, instructions 116 and any other instructions described herein in relation to storage medium 114 may be stored on a machine-readable storage medium remote from but accessible to computing device 102 and processing resource 112.

Processing resource 112 may fetch, decode, and execute instructions stored on storage medium 114 to implement the functionalities described below. In other examples, the functionalities of any of the instructions of storage medium 114 may be implemented in the form of electronic circuitry, in the form of executable instructions encoded on a machine readable storage medium, or a combination thereof.

In examples, computing device 102 may be a server. In some examples, computing device 102 may implement at least a portion of a release code printing service. In some examples, instructions 116 may be part of a larger set of instructions implementing a release code printing service. In some examples, portions of a release code printing service may be implemented on different computing devices.

In the example of FIG. 1, the instructions 116 stored at machine readable storage medium 114 cause computing device 102 to receive a print job 118 that is sent from the first mobile computing device 104. In examples, the print job may be a document to be printed, an image to be printed, or any other type of content to be printed. In examples, the print job may also include instructions as to formatting and presentation of the content.

Figure 2B:
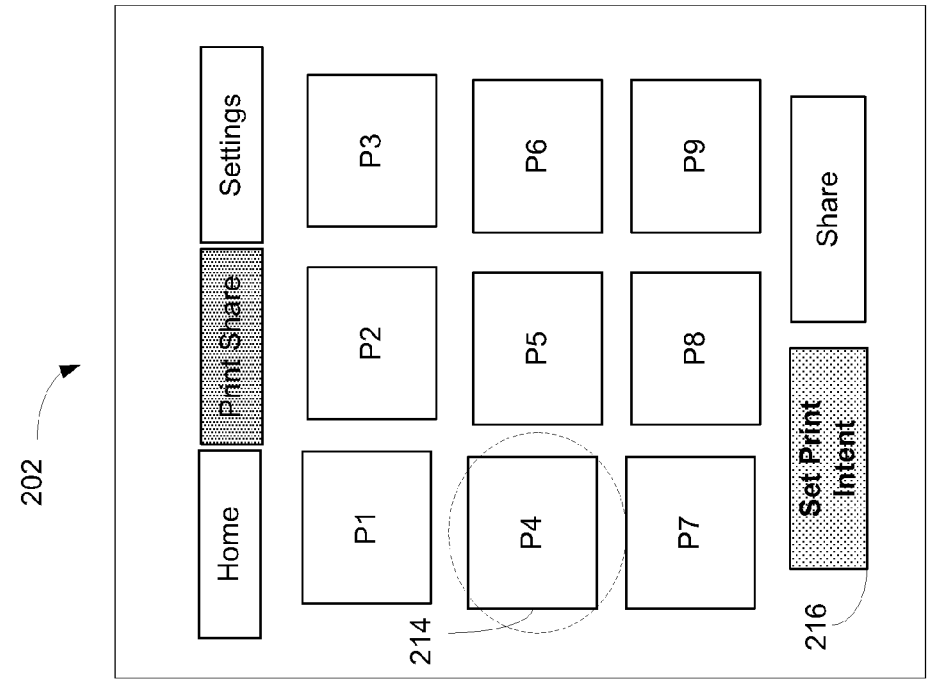
FIG. 2B is an example of a user interface to facilitate a release code printing service, according to various examples.
Figure 2A:
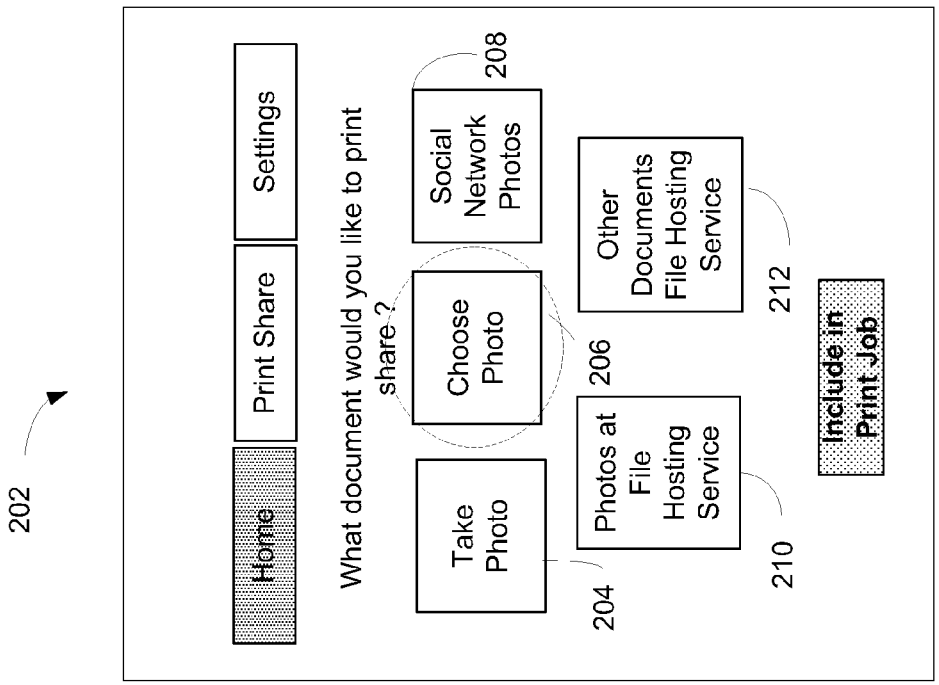
FIG. 2A is an example of a user interface to facilitate a release code printing service, according to various examples.

FIGS. 2A and 2B provide screen shots of an example application user interface 202 that executes at, or is accessible to, a user at first mobile device 104. The application and the user interface 202 are to enable the user at mobile device 104 to initiate sharing of print job 118 with one or more other mobile computing devices, including second mobile computing device 106 (FIG. 1). Moving to the example user interface of FIG. 2A, a user at first mobile device 104 can choose between various content to share, including taking a new photo image 204 at the first mobile device 104, choosing a previously captured photo image 206 stored at the mobile device 104, or accessing, e.g., via the internet or another network, previously captured photo images available via a social network application 208 accessible via the network (e.g., Facebook® or LinkedIn®). The user at mobile device 104 can also can choose to include in the print job 118 photo content 210 or document content 212 that stored at a file hosting service (e.g., Dropbox™ or any cloud-based storage service) and accessible to first mobile device 104. Moving to FIG. 2B, after identifying at type of content to share as a print job 118, the user at first mobile device 104 can select particular photos, documents, or other content to be included in the print job 118. In the example of FIGS. 2A and 2B, the user at mobile device 104 has chosen to create a print job 118 that includes a "P4" photo 214 that is stored at the first mobile device 104.

FIG. 2C provides another screen shot of an example application user interface 202 displayable at first mobile device 104. In an example, after the user at first mobile device 104 selects the photo, document, or other content to be included in the print job 118, the user can create a directive that governs, restricts or otherwise regards printing or forwarding of the job by another computing device or device with which first mobile device 104 shares a print job 118. In another example, the creation of the directive may occur prior to the selection of content. In examples, the directive may be, or include, a number of copies of the print job that are authorized to be printed, a number of forwards of the job print jobs that are authorized, or a specific printing time or time period during which printing of the print job is authorized.

In the example of FIG. 2C, the user at mobile device 104 has set a print occurrences directive 220 that a shared print job 118 may be printed one time. In this example, the user has also set a job forwarding directive 222 that when the print job 118 is shared with a recipient computing device, the recipient device cannot forward the print job 118 to other computing devices. In this example, the user has also set a print schedule directive 224 that the print job 118 shared with a recipient mobile device is printable during the day it is sent by the first mobile device 104, up to and including a stop time of 1:00 pm. These examples of print job directives are not meant to exclusive, and many other sorts of directives towards printing of a shared print job 118 can be made by a user at first mobile device 104.

Returning to FIG. 1, upon receipt of the print job 118 at computing device 102, the instructions 116 cause the print job 118 to be stored in association with a print job identifier 120. In examples, the print job identifier 120 may be a character string, encoded image, or any other data is can be processed and stored by computer 102, and that identifies, indicates, or names print job 118. In an example, the instructions cause the computing device 102 to create the job identifier 120. In examples, the job identifier 120 may be stored at the storage medium 114, or at a separate memory 122.

Following storage of the job identifier 120, the instructions 116 cause the computing device 102 to send the job identifier 120 to the first mobile device 104 (the device 104 that sent the print job to the computing device 102). After the first mobile device 104 receives the job identifier 104 from the computing device 102, the first mobile device 104 creates a release code 126 that includes the job identifier 120 and the directive 124 that imposes restrictions on printing or forwarding of the print job 118 (e.g., including, but not limited to one or more of the print occurrences directive, the job forwarding directive, and the print schedule directive discussed at FIG. 2). In examples, a release code may be include one or more of a text, number, PIN, password, character string, image, or graphic. In an example, the release code may unencrypted, and in another example the release code may be encrypted.

In this example, the release code 126 is created or generated by an application executing at the first mobile device 104. In another example, the release code 126 is created or generated by an application that executes at a computing device separate from first mobile device 104, yet is accessible to first mobile device 104 (e.g. a web application). In another example, the release code 126 may be received from another computing device, or a service executing at another computing device, that combines job identifiers and directives to create release codes.

Continuing with the example of FIG. 1, the first mobile device 104 sends the release code 216 to a second mobile computing device 106 via a near field communication ("NFC"), Bluetooth™, or other wireless transaction 128. For example, if the release code is being transferred via a NFC transaction, the user at the first device may initiate this wireless transaction by causing the first mobile device 104 to touch, or otherwise come within the NFC wireless range of, the second mobile device. Upon the occurrence of the touch or coming into range, the first mobile device send the release code 126 to the second mobile device 106. In an example, upon completion of this wireless transaction to send the release code 126 to the second mobile device 106, the instructions 116 may case the computing device 102 send a "successful transfer" message, which may include details of the transfer, to one or both of first mobile device 104 and second mobile device 106.

Continuing with this example, after receipt of the release code 126 at the second mobile device 106, the second mobile device 106 sends the release code 126 to the computing device 102 and the instructions 116 cause the computing device 102 to receive the release code 126. FIG. 2D provides a screen shot of an example application user interface 226 displayable at second mobile device 106. In this example, the user interface 226 enables a user to interact with a "print' graphic user interface icon 228 to cause the printing of print job 118 at a printer 108 associated with the second mobile device 106. Print job 118 is the job that includes the "P4" photo 214 (FIG. 2B) that was selected for sharing with second mobile device 106 by a user at the first mobile device 104, and that was sent to the computing device 102.

After the job identifier 120 and the directive 124 are accessed or revealed, the instructions 116 cause the computing device 102 to utilize the job identifier to identify the network-connected printer 108 associated with the second mobile device 106, and to utilize the directive 124 to determine the validity of the release code 126. In an example, identifying the printer 108 includes accessing a database that associates printers or printer users with mobile computing devices. In another example, identifying the printer 108 associated with the second mobile device 106 includes receiving from the second mobile device 106 a printer selection or other instruction that identifies the printer 108 as a printer associated with the second mobile device 106, and instructs the computing device 102 to send the print job 118 to the identified printer 108.

In an example, determining the validity of the release code 126 includes determining that the computing device 102 sending the print job 118 to the identified printer 108 will not violate the directive 124. For example, if the directive 124 includes a first directive restricting printing of the job 118 to one printing, a second directive restricting forwarding of the job 118 to another computing device to one forwarding, and a third directive restricting such that after date x the shared print job cannot be printed, and printing of the job at printer 118 would violate one of these directives, then the instructions 116 will prohibit computing device 102 from forwarding the job to printer 118. On the other hand, in this example if it is determined that sending the print job 118 to the identified printer 108 will not violate any portion of the directive 124, and that the release code 126 is not otherwise invalid, the instructions 116 cause the computing device 102 to send the print job 118 to the printer 108 for printing.

In examples, the receipt of the print job 118 from the first mobile device 104, the sending of the job identifier 129 to the first mobile device 104, the receipt of the release code 126 from the second mobile device 106, and/or sending of the print job 118 to the printer 108 over the network 110 via a networking protocol, including but not limited to Transmission Control Protocol/Internet Protocol ("TCP/IP"), HyperText Transfer Protocol ("HTTP"), and/or Session Initiation Protocol ("SIP").

In some examples, instructions 116 may be part of an installation package that, when installed, may be executed by processing resource 112 to implement the functionalities described herein in relation to instructions 116. In such examples, storage medium 114 may be a portable medium, such as a CD, DVD, or flash drive, or a memory maintained by a server from which the installation package can be downloaded and installed. In other examples, instructions 116 may be part of an application or applications already installed on computing device 102 including processing resource 112. In such examples, the storage medium 114 may include memory such as a hard drive, solid state drive, or the like. While in the example of FIG. 1 the storage medium 114 and memory 122 appear as separate components or modules, in other examples some or all of memory 122 may be included within or a part of storage medium 114. In yet other examples, some or all of storage medium 114 may be included within or be a part of memory 122. In some examples, functionalities described herein in relation to FIG. 1 may be provided in combination with functionalities described herein in relation to any of FIG. 2A-2D, 3 or 4.

Figure 3:
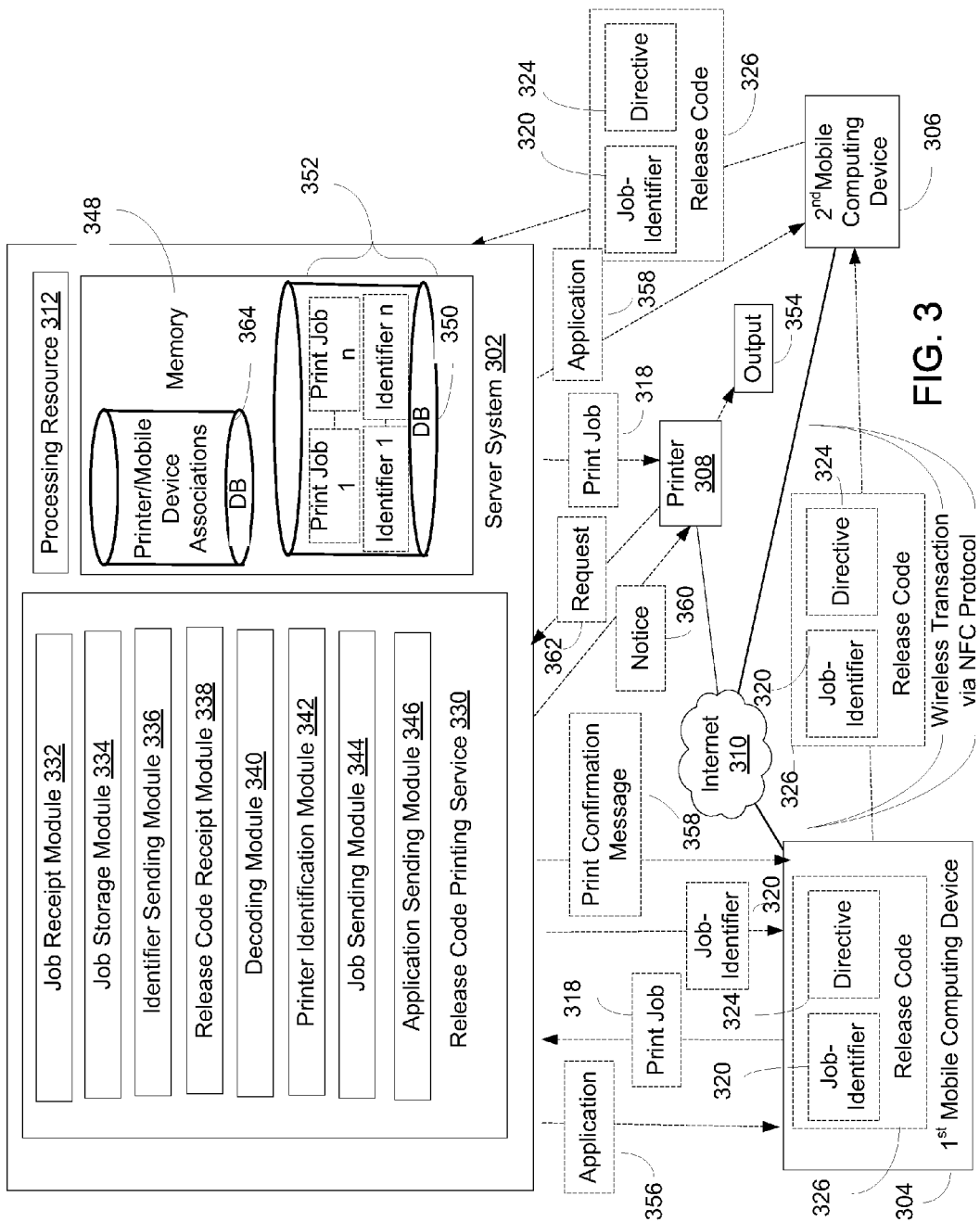
FIG. 3 is a block diagram illustrating a system, according to various examples.

FIG. 3 is a block diagram illustrating a system according to various examples. FIG. 3 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 3 shows a server system 302, a first mobile computing device 304, a second mobile computing device 306, and a printer 308. The server system 302 is electronically connected to the first mobile device 304, the second mobile device 306, and the printer 308 via an internet 310.

Server system 302 represents generally any computing device or group of computing devices configured to send and receive network requests, send and receive data, and/or otherwise communicate with the first mobile device 304, the second mobile device 306, and the printer 308 via internet 310. First mobile device 304 represents generally a smartphone, tablet computer, notebook computer, or any other mobile computing device configured to send and receive network requests, send and receive data, and/or otherwise communicate with the server system 302 via the internet 310, and with the second mobile device 306 via a wireless transaction. Second mobile device 306 represents generally a smartphone, tablet computer, notebook computer, or any other mobile computing device configured to send and receive network requests, send and receive data, and/or otherwise communicate with the server system 302 via the internet 310, and with the first mobile device 304 via a wireless transaction. Printer 304 represents generally any computing device or group of computing devices operable to produce a printed print job or printed content, and additionally operable to send and receive internet requests, receive printable content and print jobs, and otherwise communicate, via the internet 310, with, the server system 302.

Internet 310 represents generally a network, and may be, or may include at least in part, an intranet, the Internet, or a combination of both. Internet 310 may also include intermediate proxies, routers, switches, load balancers, and the like. The paths followed by internet 310 between the server system 302, first mobile device 304, second mobile device 306, and printer 308 as depicted in FIG. 3 represent the logical communication paths between these devices, not necessarily the physical paths between the devices.

Server system 302 is shown to include a release code printing service 330, a processing resource 312, and a memory 348. The release code printing service ("RCPS") 330 includes a job receipt module 332, a job storage module 334, and an identifier sending module 336, a release code receipt module 338, a decoding module 340, a print identification module 342, a job sending module 344, and an application sending module 346. Memory 348 represents generally any memory configured to store program instructions and other data.

In an example, the job receipt module 332 executing at server system 302 causes server system 302 to receive a print job 318 that is sent from the first mobile computing device 304. In an example, the print job 318 may be a document to be printed and include instructions as to formatting and presentation of the content.

Upon receipt of the print job 318 at server system 302, the job storage module 334 causes the print job 318 to be stored in association with a print job identifier 320. In an example, the print job identifier 320 may be a character string that identifies, indicates, or names print job 318. In this example, the job identifier 320 is stored at a database 350 that includes associations 352 of stored print jobs "1-n" with print job identifiers "1-n".

After storage of the job identifier 320, the identifier sending module 336 causes the server system 302 to send the job identifier 320 to the first mobile device 304 (the device 304 that sent the print job 318 to the server system 302).

After the first mobile device 304 receives the job identifier 320 from the server system 302, the first mobile device 304 creates a release code 326 that includes the job identifier 320 and the directive 324 that impose restrictions on printing or forwarding of the print job 318.

In this example, a user of the first mobile device 304 and a user of a second mobile computing device 306 cause the devices to touch, thereby sending the release code 326 to the second mobile device 306 via a near field communication ("NFC") short-range wireless transaction 328. After receipt of the release code 326 at the second mobile device 306, the second mobile device 306 sends the release code 326 to the server system 302 and the release code receipt module 338 causes the server system 302 to receive the release code 326. In this example, we assume that the release code is an encrypted format, such that the decoding module 340 then decrypts the release code 326 to access or reveal the job identifier 320 and the directive 324.

After the job identifier 320 and the directive 324 are accessed or revealed, the print identification module 342 utilizes the job identifier 320 to identify a network-connected printer 308 associated with the second mobile device 306, and to utilize the directive 324 to determine the validity of the release code 326. In this example, identifying the printer 308 includes accessing a printer/mobile device associations database 364 that associates printers or printer users with mobile computing devices.

Next the job sending module determines the validity of the release code. In an example, determining the validity of the release code 326 includes determining that the server system 302 sending the print job 318 to the identified printer 308 will not violate the directive 324. In an example, if printing of the job at printer 318 would violate the directive 324, then the job sending module 344 will not send the print job 318 to the printer 318. On the other hand, if the job sending module 344 determines that sending the print job 318 to the identified printer 308 will not violate the directive 324, and that the release code 326 is not otherwise invalid, the print job 318 is sent to the printer 308 for printing. Printer 308 then prints the job 318 on a media to created printed output 354.

In another example, after confirming the validity of the release code 326 the job sending module 344 may send a notice message 360 to the printer 308 informing the printer 308 that that the print job 319 is available for retrieval by the printer 308, and in turn send the job 318 to the printer 308 responsive to receiving from the printer 308 a request message 362 requesting that server system 302 send the job 318 to the printer 308. In an example, the job ending module 344 may receive a message from the printer 308 that confirms printing, and in turn send a print confirmation message 358 to the first mobile device 304 to advise, e.g., for display to a user, that the print job 318 shared with the second mobile device 306 has been printed by a printer 308 associated with the device 306.

In some examples of the disclosure, the release code printing service 330 includes an application sending module 346. The application sending module 346 may send to the first mobile device 304 an application 356 to facilitate sending of the print job 318 from the first mobile device 304 to the server system 302, and to facilitate the sending of the release code 326 from the first mobile device 304 to the second mobile device 306. In examples, application sending module 346 may send to the second mobile device 306 a copy of that software application or a distinct software application 358, to facilitate receiving of the release code 326 at the second mobile device 306 from the first mobile device 304, and to facilitate the second mobile device 306 sending to the server system 302 the release code 326 that the second mobile device 306 received from the first mobile device 304.

The functions and operations described with respect to the RCPS 330 and the server system 302 may be implemented as a non-transitory computer-readable storage medium containing instructions executed by a processor (e.g., processing resource 312) and stored in a memory (e.g., memory 348). In a given implementation, processing resource 312 may represent multiple processors, and memory 348 may represent multiple memories.

Figure 4:
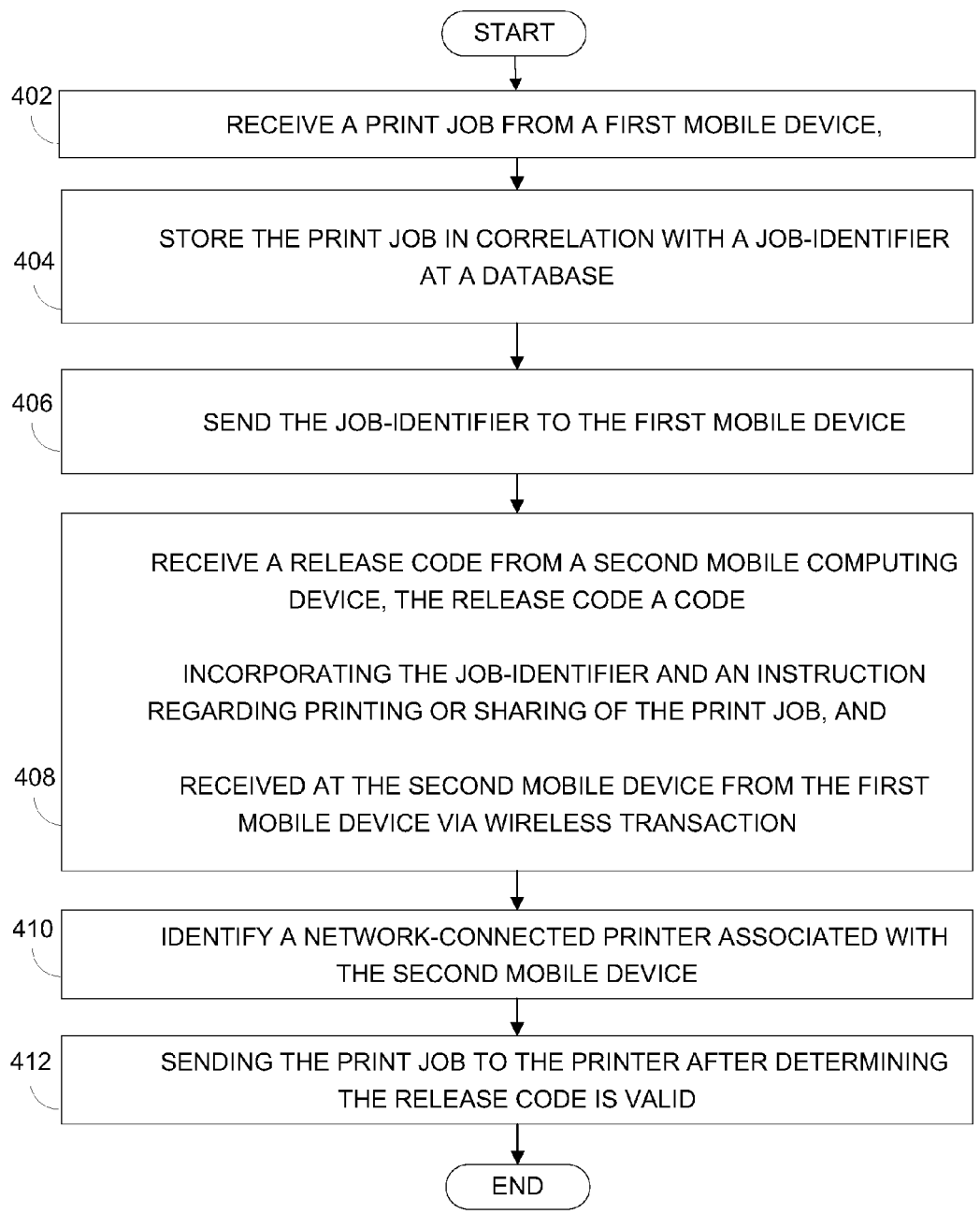
FIG. 4 is a flow diagram depicting steps taken to implement various examples.

FIG. 4 is a flow diagram of operation in a system according to various examples. In discussing FIG. 4, reference may be made to the diagram of FIG. 3 to provide contextual examples. Implementation, however, is not limited to those examples. Starting with FIG. 4, a print job is received from a first mobile device (block 402). Referring back to FIG. 3, job receipt module 332 may be responsible for implementing block 402.

Continuing with FIG. 4, the print job is stored in correlation with a job identifier at a database (block 404). Referring back to FIG. 3, job storage module 334 may be responsible for implementing block 404.

Continuing with FIG. 4, the job identifier is sent to the first device (block 406). Referring back to FIG. 3, identifier sending module 336 may be responsible for implementing block 406.

Continuing with FIG. 4, a release code is received from a second mobile computing device. The release code incorporates the job identifier and an instruction regarding printing or sharing of the print job. Further, the release code was received at the second mobile device from the first device via wireless transaction (block 408). Referring back to FIG. 3, release code receipt module 338 may be responsible for implementing block 408.

Continuing with FIG. 4, a network-connected printer that is associated with the second mobile device is identified (block 410). Referring back to FIG. 3, printer identification module 342 may be responsible for implementing block 410.

Continuing with FIG. 4, after it is determined the release code is valid the print job is sent to the printer (block 412). Referring back to FIG. 3, job sending module 344 may be responsible for implementing block 412.

Various modifications may be made to the disclosed examples and implementations without departing from their scope. Therefore, the illustrations and examples herein should be construed in an illustrative, and not a restrictive, sense.

What is claimed is:

1. A non-transitory computer-readable storage medium comprising instructions that, when executed by a processor, cause a system to:
   receive a print job from a first mobile computing device;
   store the print job in association with a job identifier;
   send the job identifier to the first mobile computing device;
   send, to the first mobile computing device, an application to facilitate sending of the print job from the first mobile computing device to the system, and facilitate sending of a release code from the first mobile computing device to a second mobile computing device;
   receive the release code from the second mobile computing device, wherein the release code including the job identifier and a directive regarding printing or forwarding of the print job is received at the second mobile computing device from the first mobile computing device via a wireless transaction;
   identify a network-connected printer associated with the second mobile computing device based on the job identifier in the release code;
   determine whether the release code is valid based on the directive in the release code; and
   responsive to a determination that the release code is valid, send the print job to the network-connected printer.

2. The medium of claim 1, wherein the instructions cause the system to decrypt the release code to access the job identifier and the directive.

3. The medium of claim 1, wherein the release code was received at the second mobile computing device from the first mobile computing device via a near field communication wireless transaction.

4. The medium of claim 1, wherein the release code is a release code received at the second mobile computing device from the first mobile computing device via at least one of a near field communication, Bluetooth, or other short-range wireless protocol.

5. The medium of claim 1, wherein determining the validity of the release code includes determining that sending the print job to the network-connected printer does not violate the directive.

6. The medium of claim 1, wherein the directive incorporates at least one of
   a number of print copies authorized,
   a number of forwards of the print job authorized, or
   a printing time or time period authorized.

7. The medium of claim 1, wherein the release code is generated by an application executing at, or accessed by, the first mobile computing device.

8. The medium of claim 1, wherein the instructions cause the system to send to the second mobile computing device an application to facilitate receiving of the release code from the first mobile computing device, and sending of the release code from the second mobile computing device to the system.

9. The medium of claim 1, wherein identifying the network-connected printer associated with the second mobile computing device includes accessing a database that associates printers or printer users with mobile computing devices.

10. The medium of claim 1, wherein identifying the network-connected printer associated with the second mobile computing device includes receiving from the second mobile computing device a directive to send the print job to the network-connected printer.

11. The medium of claim 1, wherein the instructions cause the system to send a message to the first mobile computing device to inform the first mobile computing device that the print job has been printed.

12. The medium of claim 1, wherein the instructions cause the system to send a message to the network-connected printer informing the printer that that the print job is available for retrieval, and receiving from the network-connected printer a message requesting sending of the print job to the network-connected printer.

13. A system, comprising:
   a memory storing instructions; and
   a processor to execute the instructions stored in the memory to cause the processor to:
   receive a print job from a first mobile computing device;
   store the print job in association with a job identifier;
   send the job identifier to the first mobile computing device;
   send, to the first mobile computing device, an application to facilitate sending of the print job from the first mobile computing device to the system, and facilitate sending of a release code from the first mobile computing device to a second mobile computing device;
   receive from the second mobile computing device the release code that includes the job identifier and a directive regarding printing of the print job, and received at the second mobile computing device from the first mobile computing device via a wireless transaction;

identify a network-connected printer associated with the second mobile computing device based on the job identifier in the release code;

determine whether the release code is valid based on the directive in the release code; and send the print job to the network-connected printer after determining that the release code is valid.

14. The system of claim 13, wherein the instructions are to cause the processor to decrypt the release code to access or reveal the job identifier and the directive.

15. The system of claim 13, wherein the release code is received at the second mobile computing device from the first mobile computing device via a short-range wireless protocol.

16. The system of claim 13, wherein the directive includes an authorization of a number of print copies of the print job or an authorization of a time or time period for printing of the print job.

17. A processor-implemented method, comprising receiving, from a first mobile computing device, a print job;

storing the print job in correlation with a job identifier at a database;

sending the job identifier to the first mobile computing device;

sending, to the first mobile computing device, an application to facilitate sending of the print job from the first mobile computing device, and to facilitate sending of a release code from the first mobile computing device to a second mobile computing device;

receiving the release code from the second mobile computing device, wherein the release code including the job identifier and an instruction regarding printing or sharing of the print job is received at the second mobile computing device from the first mobile computing device via a near field communication wireless transaction or other short-range wireless protocol transaction;

decoding the release code to access the job identifier and the instruction;

identifying a network-connected printer associated with the second mobile computing device based on the job identifier in the release code;

determining the validity of the release code based on the instruction in the release code; and sending the print job to the network-connected printer after determining that the release code is valid.

18. The method of claim 17, wherein the release code is generated at the first mobile computing device.

19. The method of claim 17, further comprising accessing the database to locate the print job via the job identifier.

* * * * *